(No Model.)
W. E. WHITE & E. H. TAYLOR.
KNIFE BLADE HOLDER.
No. 371,014.            Patented Oct. 4, 1887.
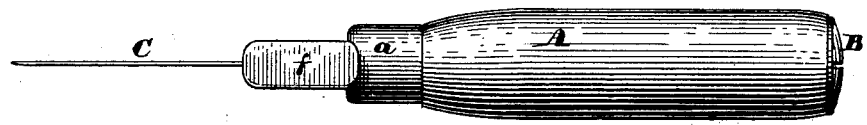
Fig. 1.
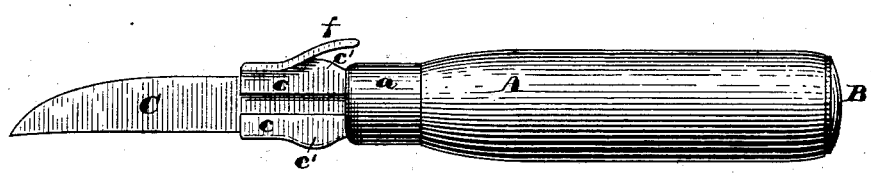
Fig. 2.
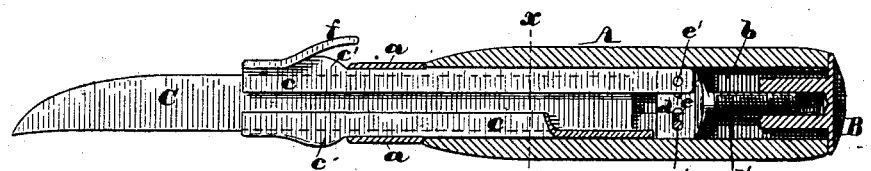
Fig. 3.
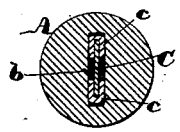      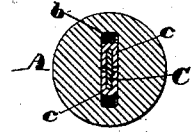
Fig. 4.         Fig. 6.
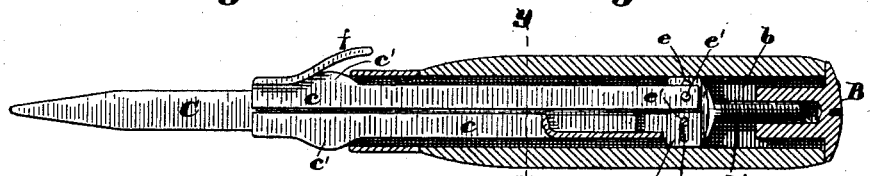
Fig. 5.
Fig. 7.
Witnesses:
Walter E. Lombard.
Alvin P. Johnson.
Inventors:
William E. White,
Eugene H. Taylor,
by N. C. Lombard,
Attorney.

UNITED STATES PATENT OFFICE.

WILLIAM E. WHITE AND EUGENE H. TAYLOR, OF LYNN, MASSACHUSETTS; SAID TAYLOR ASSIGNOR TO SAID WHITE.

KNIFE-BLADE HOLDER.

SPECIFICATION forming part of Letters Patent No. 371,014, dated October 4, 1887.

Application filed April 16, 1887. Serial No. 235,111. (No model.)

*To all whom it may concern:*

Be it known that we, WILLIAM E. WHITE and EUGENE H. TAYLOR, both of Lynn, in the county of Essex and State of Massachusetts, have invented, jointly, a new and useful Improvement in Knife-Blade Holders, of which the following, taken in connection with the accompanying drawings, is a specification.

Our invention relates to handles for removable and adjustable knife-blades, and is an improvement upon the invention shown and described in Letters Patent No. 51,297, granted to Samuel A. Cummings December 5, 1865.

Knife-handles for holding detachable or adjustable blades have for a long time been extensively used for cutting out boot and shoe uppers, for which purpose blades of two or more different widths, ranging from, say, three-sixteenths to three-eighths of an inch in width, are required for the different classes of work, and heretofore a separate handle had to be furnished for each width of blade, for the reason that the clamping-jaws were pivoted at their inner ends by fixed fulcrum-pins to the threaded shank by which they were moved endwise in the handle, and as a consequence, if a narrower blade were inserted in the handle, the clamping-jaws would bear upon the edges of the blade only at their outer ends and would not hold said blade firm.

To obviate this objection and produce a knife-blade holder capable of holding firmly a knife-blade of any width between, say, three-sixteenths and three-eighths of an inch in width, is the object of our invention; and it consists in a handle having an oblong opening extending longitudinally through the same and through a capped ferrule fitted upon one end thereof, in combination with a pair of longitudinally-grooved clamping-bars placed within said opening in the handle parallel with each other, each of said bars being provided near its outer end upon its outer edge with a cam-like projection, and connected at its inner end by an adjustable attachment to a plate provided with a threaded shank, and a long nut provided with a collar or shoulder to bear upon the end of the handle opposite to the ferrule, the whole being so constructed and arranged that when a blade of either of the widths usually used is placed in the grooves of the clamping-bars and the nut is turned to draw said bars toward the nut end of the handle, the cam-surfaces on said bars, coming in contact with the ends of the slot through the ferrule, will cause said bars to move bodily toward each other until the bottom of the groove in each bar bears hard upon the edge of the knife-blade throughout the length of the bars, instead of bearing only at their outer ends upon said blade, as would be the case if said bars were pivoted to the draft-plate by a fixed fulcrum-pin.

In the drawings, Figure 1 is a plan of a knife-holder embodying our invention. Fig. 2 is a side elevation of the same with one of the wider knife-blades therein. Fig. 3 is a longitudinal section through the wooden handle, the draft-nut, and a small portion of one of the clamping-bars, and showing the other parts in elevation. Fig. 4 is a transverse section on line $x\ x$ on Fig. 3. Fig. 5 is a longitudinal section similar to Fig. 3, but showing the holder with one of the narrower blades applied thereto. Fig. 6 is a transverse section on line $y\ y$ on Fig. 5, and Fig. 7 is an edge view of a portion of one of the clamping-bars and the screw-stem for operating the same.

In the drawings, A is the handle, which may be made of wood or any other desired suitable material, upon one end of which is secured the capped ferrule $a$, through the center of which, and extending from end to end of the handle, is formed the oblong slot or opening $b$. Within the slot $b$ are fitted the two grooved clamping-bars $c\ c$, each provided with the cam-shaped projection $c'$, which impinges against the end of the slot through the cap of the ferrule when said bar is moved toward the opposite end of the handle. A thin metal plate, $d$, provided with a threaded shank, $d'$, and the two slots $e\ e$, is fitted within the slot of said handle, and is moved endwise therein by means of the headed nut B, the head of which bears against the end of the handle A, as shown. The inner ends of the bars $c\ c$ are forked, so as to straddle or embrace the plate $d$, to which they are connected by pins $e'\ e'$, set in the forked ends of said bars and passing through the slots $e\ e$ in the plate $d$, as shown in Figs. 3 and 5.

By means of the adjustable connection of the bars *c c* with the plate *d*, said bars are rendered capable of being moved bodily toward each other, so as to clamp the knife-blade C along their whole lengths when the nut B is turned to draw said bars farther into the handle, and cause the cam-surfaces *c'* to impinge upon the ends of the slot in the capped end of the ferrule *a*.

One of the bars *c* has secured thereon the curved finger rest or plate *f*, upon which the operator places his forefinger when using the knife for the purpose of insuring a better control of the knife.

What we claim as new, and desire to secure by Letters Patent of the United States, is—

1. A knife-blade holder having the following elements, viz: a longitudinally-slotted handle, a pair of clamping-bars, each provided upon its inner edge with a longitudinal groove and upon its outer edge, near one end, with a cam projection, and forked at its other end, a plate provided with a threaded shank, and a headed nut fitted to said shank with its head bearing upon the end of the handle, said plate and the inner or forked ends of the clamping-bars being connected together by pins passing through slots extending transversely of the axis of the handle, substantially as described.

2. In a knife-blade holder, the combination of a longitudinally-slotted handle provided with a capped ferrule having an oblong slot through its cap, a pair of grooved clamping-bars provided with cam-projections upon their outer edges and forked at their inner ends, a plate provided with a threaded shank, a nut for moving said plate and shank endwise, said plate being provided with two slots extending transversely of the axis of the handle, and a pin extending through the forked end of each clamp-bar and one of said slots, whereby said clamping-bars are adapted to be moved bodily toward each other to clamp the knife-blade, substantially as described.

In testimony whereof we have signed our names to this specification, in the presence of two subscribing witnesses, on this 9th day of April, A. D. 1887.

WILLIAM E. WHITE.
EUGENE H. TAYLOR.

Witnesses:
N. C. LOMBARD,
WALTER E. LOMBARD.